United States Patent [19]

Reddell

[11] 4,132,223
[45] Jan. 2, 1979

[54] TRACKING SYSTEM FOR SOLAR ENERGY COLLECTOR

[76] Inventor: E. Garland Reddell, 115 E. 26th St., Yuma, Ariz. 85364

[21] Appl. No.: 830,757

[22] Filed: Sep. 6, 1977

[51] Int. Cl.² .................................................. F24J 3/02
[52] U.S. Cl. ...................................... 126/271; 126/270; 136/89 PC; 60/640; 60/641; 250/203 R
[58] Field of Search ................ 126/270, 271; 237/1 A; 60/641, 531, 640; 136/89 PC; 250/203 R

[56] References Cited

U.S. PATENT DOCUMENTS

| 1,459,645 | 6/1923 | Wilson | 60/640 |
| 2,239,064 | 4/1941 | Tower | 60/640 |
| 2,993,125 | 7/1961 | Geer et al. | 126/271 |
| 3,515,594 | 6/1970 | Samuals | 136/89 PC |
| 4,044,752 | 8/1977 | Barak | 126/270 |
| 4,079,249 | 3/1978 | Glynn | 60/641 |

Primary Examiner—Kenneth W. Sprague
Assistant Examiner—James C. Yeung
Attorney, Agent, or Firm—Cahill, Sutton & Thomas

[57] ABSTRACT

A pivotally mounted solar energy collector is maintained oriented towards the sun by creating a continuing imbalance of the collector about its pivotal axis resulting in pivotal movement of the collector to track the sun. The imbalance is achieved by regulating the flow of a pumped fluid from a container located at one side of the collector to a container located at another side of the collector. Pump, timing and energizing means are included to control the flow rate of the fluid.

10 Claims, 4 Drawing Figures

TRACKING SYSTEM FOR SOLAR ENERGY COLLECTOR

The present invention relates to solar tracking systems and, more particularly, to non-feedback operated solar tracking systems.

For years, various methods and apparatus have been developed in attempts to harness the sun's rays for heating purposes. Invariably, all of the prior art solar tracking systems are either too expensive to build to justify residential use or the degree of efficiency of the less expensive but positionable solar tracking systems is too low to be of practical utility. For these and related reasons, the present thrust and developmental work attendant the deployment of solar energy for residential heating purposes is primarily directed to flat plate non-movable units. Such units are relatively inexpensive and, over a period of years, will provide a reasonably satisfactory return on the amount invested by way of reduced costs for utility services.

To optimize the collection of the heat content of solar energy, it is preferable that reflecting surfaces be employed which focus the impinging sun's rays at a collection point. A heat exchanger is located at the collection point to transfer heat to a medium. The reflecting surface, in order to reflect the sun's rays upon the collection point, must generally be continuously reoriented to track the sun. Tracking systems for this purpose and employing feedback systems for insuring tracking accuracy are well known, as illustrated and described in the following U.S. Pat. Nos.: 2,135,997; 2,712,772; 3,996,917 and 4,013,885. These described systems are functionally adequate but the degree of sophistication of the apparatus and the construction and maintenance expenses thereof generally preclude them from being of any value for residential heating purposes.

In an effort to reduce the expense of solar tracking systems, various mechanically driven apparatus have been developed which do not incorporate solar positional feedback information inputs. The following United States patents are representative thereof: Nos.: 2,646,720; 2,945,417; 3,656,844 and 4,011,858. In each of the these described apparatus, motorized drive means operating through gears, levers, etc., are necessary to effect reorientation of the solar reflecting and collection surfaces. Mechanisms of the type described, though very accurate when considered in conjunction with the manufacturing expenses thereof are still relatively expensive and, on an economic basis, are of questionable value for residential use.

Feedback systems or position sensing systems incorporating fluid levels or fluid flows as the sensing elements to initiate a positional change of the controlled device are well known, as illustrated in the following U.S. Pat. Nos.: 3,051,192; 3,437,065; 3,690,617 and 3,786,832.

The present invention is directed to apparatus for collecting solar energy and directing the collected solar energy to a predetermined point or location. The device is pivotally mounted such that pivotal movement thereof will track the sun. Tracking by the device of the sun is achieved through continual creation of an imbalance about the pivotal axis through transfer of fluid at a predetermined rate from one side of the device to the other.

Accordingly, it is a primary object of the present invention to provide an inexpensive solar tracking system for concentrating heat at a predetermined location.

Another object of the present invention is to provide a non-mechanically driven solar tracking system.

Still another object of the present invention is to provide a fluid flow operated solar tracking system.

A further object of the present invention is to provide a fluid flow operated tracking system useable with any type of fluid.

A still further object of the present invention is to provide an easily speed regulatable solar tracking system.

A yet further object of the present invention is to provide an inexpensive fluid flow operated solar tracking system useable at any latitude.

These and other objects of the present invention will become apparent to those skilled in the art as the description thereof proceeds.

The present invention may be described with greater specificity and clarity with reference to the following figures, in which.

Figure 1:
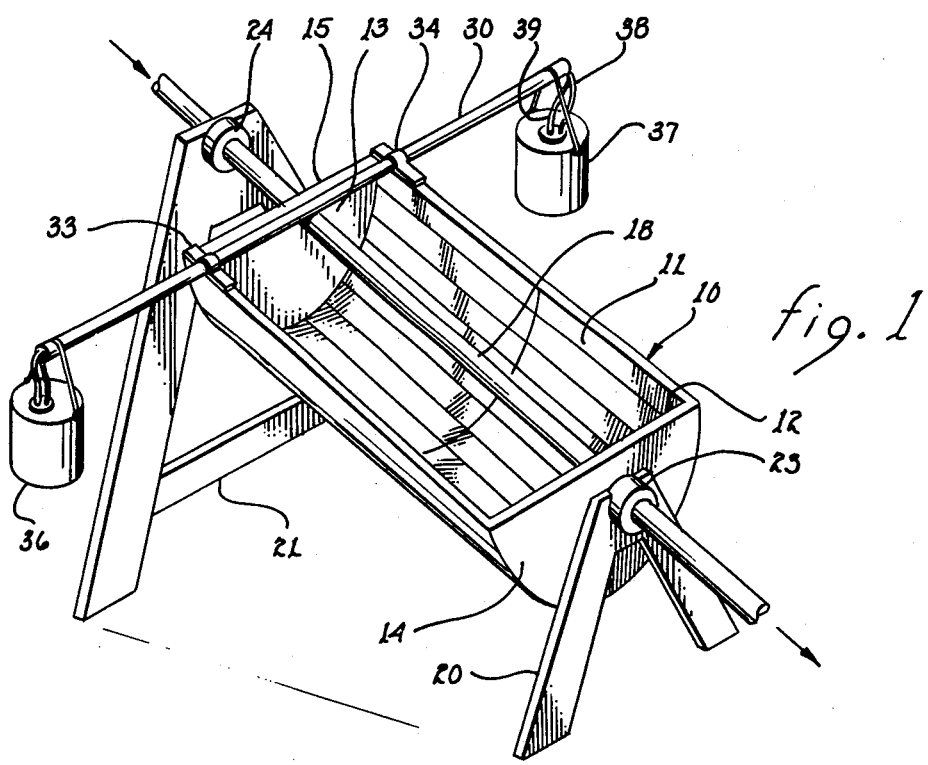
FIG. 1 is a perspective view of the present invention.

Referring to FIG. 1, there is shown a cylinder or trough 10 having a parabolic cross-section. Interior surface 11 of the trough is reflective to reflect the rays of the sun. Surfaces 12 and 13 of ends 14 and 15 may also be reflective. The locus or focus point of interior surface 11 is represented by a pipe 18. The pipe serves as a heat exchanger to impart heat to a fluid flowing therethrough, as indicated by the arrows at each end of the pipe. The trough is supported by frame members 20 and 21 and journalled within bearings 23 and 24.

It may be noted that pipe 18 is parallel to the longitudinal axis of trough 10. The orientation of the longitudinal axis of trough 10 with respect to horizontal is a function of or commensurate with the latitude of the location of the solar energy collector system. That is, one end or the other of trough 10 is raised such that the impinging sun's rays are essentially perpendicular to the longitudinal axis of the trough. This may be effected by differing sized frame members, as illustrated in FIG. 1.

To optimize the radiant energy conveyed by interior surface 11 to pipe 18, it is preferable that the trough track the sun. Such tracking is effected by a fluid flow system for continually imbalancing the trough, as will be described below.

A support 30, extending lateral to trough 10, is attached to the trough by brackets 33 and 34. A first container 36 is supported from one end of support 30 and a second container 37 is supported from the other end. Fluid is transferred intermediate containers 36 and 37 by conduits 38 and 39, which conduits extend from one container, through support 30 and into the other container.

Figure 2:
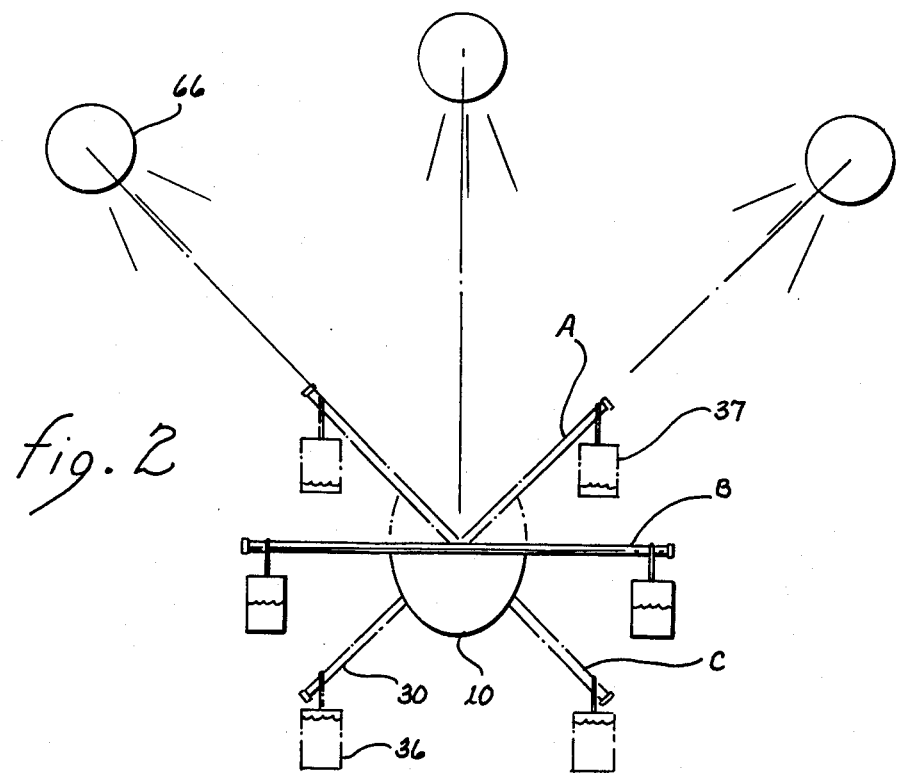
FIG. 2 is a representation of the center and extreme pivotal positions of the present invention.
Figure 3:
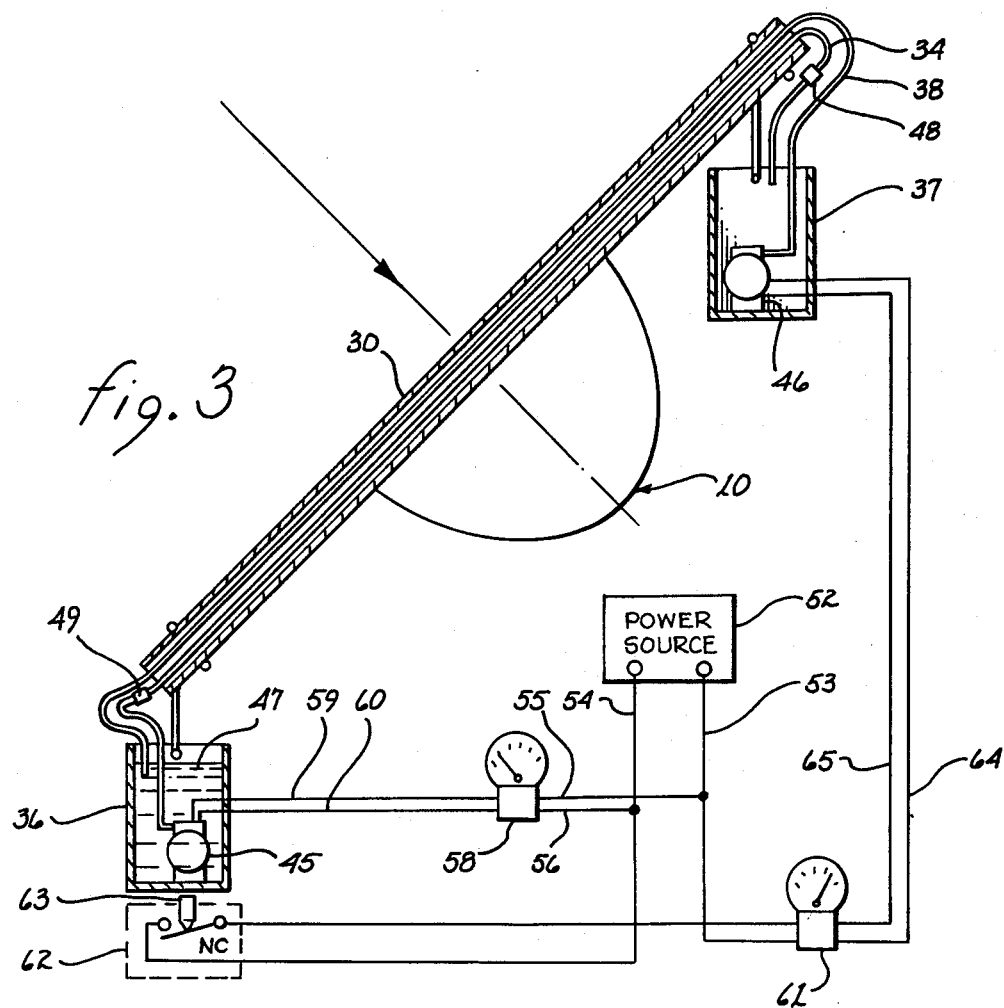
FIG. 3 is a schematic illustrating the functional elements.
Figure 4:
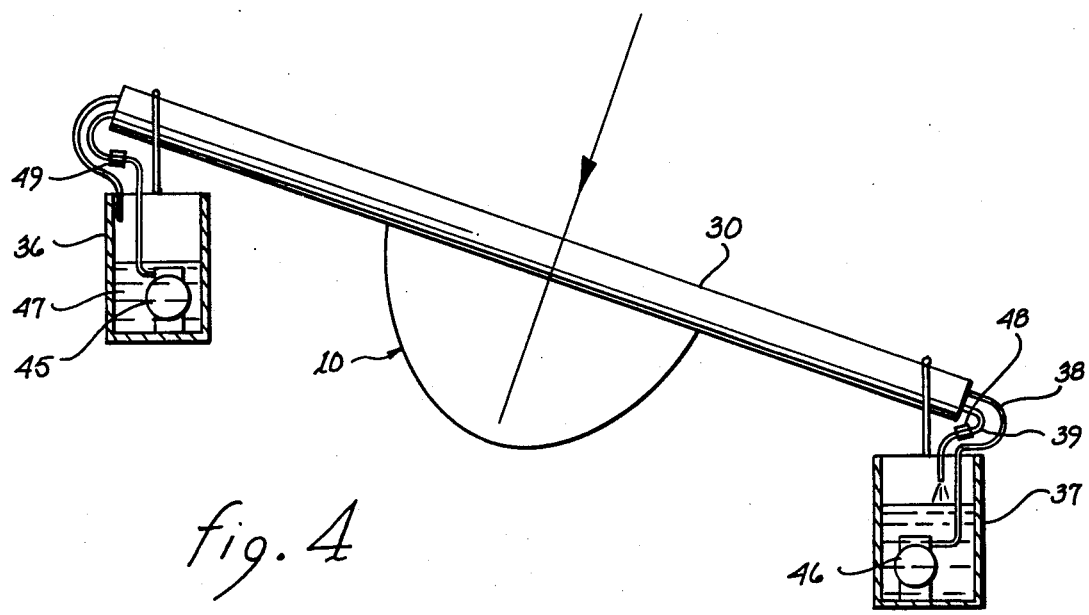
FIG. 4 represents the invention during its operating mode.

Referring jointly to FIGS. 2, 3 and 4, additional structure of the tracking system will be discussed. Container 36 includes a pump 45 for pumping fluid 47 from within the container through conduit 39, flow control valve 48 and into container 37. A check valve 49 is in series with conduit 39 to preclude back flow of fluid through the conduit. A further pump 46 is disposed within container 37 to pump fluid through conduit 38 into container 36.

A power source 52 transmits electric power through electrical conductors 53, 54 and electrical conductors 55, 56 to timer 58. Depending upon the state of timer 58, electric power is or is not transmitted through electrical conductors 59, 60 to energize pump 45. Additionally, electrical conductors 53 and 54 transmit electric power from power source 52 to timer 61 through a normally closed switch 62. Switch 62 includes a push button 63 responsive to the vertical position of container 36 such that when the container is in its lowermost position resting upon the push button, switch 62 is in the open mode. Electric power is transmitted to timer 61 to pump 46 through electrical conductors 64 and 65.

In operation, at a predetermined time in the morning, which time corresponds to impingement of the sun's rays perpendicular to the open mouth of trough 10, the state of timer 58 is switched to permit transmission of electric power through electrical conductors 59 and 60 to energize pump 46. On energization, the pump will convey fluid 47 through conduit 39 into container 37. The flow rate of the fluid is regulated by flow control valve 48. As fluid flows into container 37, an imbalance will have been created to tend to cause trough 10 and support 30 to rotate clockwise, as viewed in FIG. 3. The rate of fluid transfer is regulated by flow control valve 48 such that the rate of rotation of trough 10 (and the solar energy collector itself) is essentially commensurate with the track of the sun. Due consideration must, of course, be given to the friction attendant the rotation of the trough and the lever arms through which the varyingly weighted containers operate. Thereby, maximization of heating of pipe 18 (the heat exchanger) is effected throughout the day by focusing the collected solar energy upon the pipe.

At the end of a predeterminable time period, the maximum rotation of trough 10 will have been effected. At such time, the state of timer 58 is changed to preclude further transmission of power to pump 45 and the pump is deenergized. Shortly thereafter, or possibly simultaneously, the state of timer 61 will be changed to permit the flow of electric power through conductors 64 and 65 to energize pump 46. At this time, switch 62 will be closed since container 36 will not be resting upon push button 63. On energization of pump 46, fluid 47 will be pumped through conduit 38 back into conduit 36. The flow rate is essentially incidental as the purpose of this operation is that of returning trough 10 to its initial pivotal position and ready for use the following morning. As container 36 fills up, a counterclockwise rotation of trough 10 will be effected until such time as the container engages and depresses push button 63. When the push button is depressed, switch 62 will open and electrical power to the internally mounted switch within timer 61 is open ciruited and pump 46 will be deenergized. It may be noted that check valve 49 precludes a return flow of fluid within conduit 39 and on reenergization of pump 45, fluid will immediately flow into container 37.

FIG. 2 illustrates, in pictorial fashion, the operation of the tracking system. Early in the morning and before the tracking system is energized, trough 11, support 30 and containers 36 and 37 will be in the position identified by reference letter A. At a predeterminable time, the elevation of sun 66 will be such that the radiant energy emanating therefrom will directly impinge upon reflecting surface 11 of trough 10. At this point in time, the switch within timer 58 is actuated to provide electric power to energize pump 45. The resulting flow of fluid from container 36 to container 37 will produce a clockwise rotation of the solar energy collector, which rate of rotation is commensurate with the rate of track of the sun. Thus, at noon, when the sun is highest, the position of the trough, support and containers will be that depicted by reference letter B. It may be noted that at position B, the water level in both containers is equal. Further pumping of water from container 36 to container 37 will reposition the trough support and containers to the position identified by letter C. In this position, the water within container 36 is essentially evacuated, while container 37 is essentially full. At the rotational position C, the radiant energy from sun 66 essentially directly impinges upon the reflecting surface 11 within trough 10.

Since a track of the sun through a predetermined arc is readily calculatable, the rate of fluid flow intermediate the containers and hence the rate of rotation of the solar enegy collector are readily calculatable. Accordingly, a schedule can be established for timer 68. Per force, the selection of flow control valve 48, size of containers 36 and 37 and the pumping capacity of pump 45 must be taken into account.

From the above description, it will be readily apparent that the components of the tracking system are essentially low cost items. Yet, through tests, sufficiently accurate tracking to justify the expense of the system has been obtained repeatedly. Since no feedback information with respect to the track of the sun is necessary, intermittent cloud cover will not modulate or disrupt the tracking accuracy of the system.

Because of the ready availability of all of the components of the present invention and since the timing information necessary is readily determinable along with the angle at which the longitudinal axis of the trough is to be set dependent upon the latitude, the present invention is readily useable anywhere in the world.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:
1. A solar tracking system for maintaining a solar energy reflecting surface generally oriented toward the sun to reflect solar energy to a heat exchanger, said tracking system comprising in combination:
   a. a trough shaped solar energy reflector for reflecting solar energy to the heat exchanger, said trough having a longitudinal axis and a lateral axis;
   b. means for pivotally mounting said trough parallel to its longitudinal axis;
   c. support means extending lateral to said trough;
   d. a first container supported from said support means at one side of said trough for containing a liquid;
   e. a second container supported from said support means at another side of said trough for containing the liquid;
   f. conduit means for conveying the liquid intermediate said first and second containers;
   g. pump means for pumping the liquid through said conduit means; and h. energizing means for energizing the operation of said pump means;

whereby, transfer of the liquid from one to another of said first and second containers produces an imbalance about the pivotal axis of said trough and results in pivotal movement of said trough to maintain the reflecting surface generally oriented toward the sun and continually directs solar energy upon the heat exchanger.

2. The tracking system as set forth in claim 1 wherein said trough is parabolic in cross-section.

3. The tracking system as set forth in claim 2 wherein said mounting means is set at an angle with respect to horizontal commensurate with the latitude of the location of said trough.

4. The tracking system as set forth in claim 1 including flow regulating means for regulating the flow in one direction between said first and second containers.

5. The tracking system as set forth in claim 4 including further conduit means and further pump means for establishing a return flow path of the fluid intermediate said first and second containers.

6. The tracking system as set forth in claim 5 including additional reflective surfaces disposed at the ends of said trough.

7. The tracking system as set forth in claim 5 wherein said trough is parabolic in cross-section.

8. The tracking system as set forth in claim 7 wherein said mounting means is set at an angle with respect to horizontal commensurate with the latitude of the location of said trough.

9. The tracking system as set forth in claim 8 wherein said energizing means includes timer means for initiating and terminating operation of said pump means and said further pump means.

10. The tracking system as set forth in claim 9 including an electrical switch having a state responsive to the position of one of said first and second containers for deenergizing said further pump means.

* * * * *